(12) United States Patent
Li et al.

(10) Patent No.: US 7,596,355 B2
(45) Date of Patent: Sep. 29, 2009

(54) SYSTEM AND METHOD CAPABLE OF CLOSED LOOP MIMO CALIBRATION

(75) Inventors: Qinghua Li, Sunnyvale, CA (US); Xintian Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 10/999,621

(22) Filed: Nov. 29, 2004

(65) Prior Publication Data

US 2006/0116076 A1   Jun. 1, 2006

(51) Int. Cl.
*H04B 1/00* (2006.01)

(52) U.S. Cl. .................. 455/69; 455/41.2; 455/136; 455/434; 455/232.1; 455/138; 455/247.1; 455/250.1; 455/219; 455/70; 455/522; 455/127.1; 455/420; 455/200.1; 455/88

(58) Field of Classification Search .......... 455/69, 455/136, 434, 232.1, 247.1, 41.2, 138, 250.1, 455/219, 70, 522, 127.1, 420, 200.1, 88
See application file for complete search history.

(56) References Cited

U.S. PATENT DOCUMENTS

| | | | | |
|---|---|---|---|---|
| 5,170,392 A * | 12/1992 | Riordan | ....................... | 370/252 |
| 5,301,364 A * | 4/1994 | Arens et al. | .................... | 455/69 |
| 5,408,695 A * | 4/1995 | Dorr | ....................... | 455/226.1 |
| 5,564,080 A * | 10/1996 | Eul et al. | ...................... | 455/69 |
| 5,960,335 A * | 9/1999 | Umemoto et al. | ........ | 455/226.2 |
| 6,374,116 B1 * | 4/2002 | Peterzell et al. | ............. | 455/522 |
| 6,420,934 B1 * | 7/2002 | Butler et al. | ................ | 330/279 |
| 6,477,389 B1 * | 11/2002 | Kim | ........................... | 455/522 |
| 6,560,462 B1 * | 5/2003 | Ravi et al. | ............... | 455/456.1 |
| 6,580,920 B2 * | 6/2003 | Kalliojarvi | .................. | 455/522 |
| 6,584,139 B2 * | 6/2003 | Zeira et al. | .................. | 375/130 |
| 6,603,825 B1 * | 8/2003 | Pecen | .......................... | 375/345 |
| 6,701,264 B2 * | 3/2004 | Caso et al. | ..................... | 702/90 |

(Continued)

FOREIGN PATENT DOCUMENTS

EP    1 126 628 A    8/2001

(Continued)

OTHER PUBLICATIONS

International Search Report and Written Opinion from PCT/US2005/042302 mailed Mar. 23, 2006; 10 pgs.

(Continued)

*Primary Examiner*—Duc Nguyen
*Assistant Examiner*—Amar Daglawi
(74) *Attorney, Agent, or Firm*—Joseph P. Curtin; Cool Patent, P.C.

(57) ABSTRACT

An embodiment of the present invention provides a method of closed loop MIMO calibration in a wireless communication system, comprising detecting that station calibration is obsolete and requires calibration, determining a range of automatic gain control which the station wants to calibrate and determining a list of transmission power for an Access Point (AP) in communication with the station, initiating by the station the calibration by sending the power list and N channel sounding preambles, where N is the number of transmit antennas at the station; and sending back by the AP a channel matrix and L sets of channel sounding preambles with a different transmission power level for each set, where L is the number of entries in the power list.

24 Claims, 2 Drawing Sheets

U.S. PATENT DOCUMENTS

| | | | |
|---|---|---|---|
| 6,707,805 B2 * | 3/2004 | Ozluturk et al. | 370/335 |
| 6,721,547 B2 * | 4/2004 | Husted et al. | 455/226.1 |
| 6,728,292 B2 * | 4/2004 | Zeira et al. | 375/130 |
| 6,731,910 B2 * | 5/2004 | Taira et al. | 455/69 |
| 6,735,422 B1 * | 5/2004 | Baldwin et al. | 455/232.1 |
| 6,795,694 B2 * | 9/2004 | Uesugi | 455/126 |
| 6,799,024 B2 * | 9/2004 | Wang et al. | 455/234.1 |
| 6,859,505 B2 * | 2/2005 | Agami et al. | 375/345 |
| 6,862,440 B2 * | 3/2005 | Sampath | 455/276.1 |
| 6,885,852 B2 * | 4/2005 | Hughes et al. | 455/234.1 |
| 6,898,198 B1 * | 5/2005 | Ryan et al. | 370/338 |
| 6,922,549 B2 * | 7/2005 | Lyons et al. | 455/67.13 |
| 6,928,102 B2 * | 8/2005 | Zeira et al. | 375/130 |
| 6,937,677 B2 * | 8/2005 | Strolle et al. | 375/347 |
| 6,940,843 B2 * | 9/2005 | Goodall et al. | 370/338 |
| 6,950,641 B2 * | 9/2005 | Gu | 455/241.1 |
| 6,954,622 B2 * | 10/2005 | Nelson et al. | 455/127.1 |
| 6,980,786 B1 * | 12/2005 | Groe | 455/314 |
| 7,031,669 B2 * | 4/2006 | Vaidyanathan et al. | 455/84 |
| 7,046,966 B2 * | 5/2006 | Davis | 455/69 |
| 7,068,987 B2 * | 6/2006 | Baldwin et al. | 455/232.1 |
| 7,107,027 B2 * | 9/2006 | Zipper | 455/127.2 |
| 7,110,735 B2 * | 9/2006 | Abe | 455/234.1 |
| 7,139,537 B2 * | 11/2006 | Nakayama | 455/127.1 |
| 7,151,759 B1 * | 12/2006 | Ryan et al. | 370/332 |
| 7,154,959 B2 * | 12/2006 | Erceg et al. | 375/267 |
| 7,206,550 B2 * | 4/2007 | Li et al. | 455/69 |
| 7,206,597 B2 * | 4/2007 | Sudo | 455/522 |
| 7,212,798 B1 * | 5/2007 | Adams et al. | 455/251.1 |
| 7,236,748 B2 * | 6/2007 | Li et al. | 455/69 |
| 7,239,856 B2 * | 7/2007 | Ahn et al. | 455/127.2 |
| 7,245,893 B1 * | 7/2007 | Husted et al. | 455/226.3 |
| 7,280,804 B2 * | 10/2007 | Jacobsen et al. | 455/67.11 |
| 7,286,609 B2 * | 10/2007 | Maltsev et al. | 375/267 |
| 2002/0042256 A1 * | 4/2002 | Baldwin et al. | 455/232.1 |
| 2003/0017837 A1 * | 1/2003 | Kalliojarvi | 455/522 |
| 2003/0026363 A1 * | 2/2003 | Stoter et al. | 375/345 |
| 2003/0027538 A1 * | 2/2003 | Masumoto et al. | 455/234.1 |
| 2003/0028339 A1 * | 2/2003 | Caso et al. | 702/90 |
| 2003/0083031 A1 * | 5/2003 | Eriksson et al. | 455/250.1 |
| 2003/0144019 A1 * | 7/2003 | Nelson et al. | 455/522 |
| 2003/0153289 A1 * | 8/2003 | Hughes et al. | 455/138 |
| 2003/0194981 A1 * | 10/2003 | Rimini et al. | 455/234.1 |
| 2003/0203726 A1 * | 10/2003 | Kluge et al. | 455/234.1 |
| 2003/0207674 A1 * | 11/2003 | Hughes | 455/234.1 |
| 2003/0207675 A1 * | 11/2003 | Hughes et al. | 455/234.1 |
| 2003/0232608 A1 * | 12/2003 | Yamauchi | 455/136 |
| 2003/0236107 A1 * | 12/2003 | Azuma | 455/561 |
| 2004/0082356 A1 * | 4/2004 | Walton et al. | 455/522 |
| 2004/0085939 A1 * | 5/2004 | Wallace et al. | 370/335 |
| 2004/0102168 A1 * | 5/2004 | Ahn et al. | 455/234.1 |
| 2004/0137868 A1 * | 7/2004 | Nystrom et al. | 455/232.1 |
| 2004/0137933 A1 * | 7/2004 | Taira et al. | 455/522 |
| 2004/0218568 A1 * | 11/2004 | Goodall et al. | 370/332 |
| 2004/0242177 A1 * | 12/2004 | Yang | 455/234.1 |
| 2005/0009483 A1 * | 1/2005 | Eilts et al. | 455/136 |
| 2005/0130658 A1 * | 6/2005 | Stephens | 455/436 |
| 2005/0141459 A1 * | 6/2005 | Li et al. | 370/334 |
| 2005/0141540 A1 * | 6/2005 | Li et al. | 370/437 |
| 2005/0143014 A1 * | 6/2005 | Li et al. | 455/69 |
| 2005/0152314 A1 * | 7/2005 | Sun et al. | 370/334 |
| 2005/0163236 A1 * | 7/2005 | Hammerschmidt et al. | 375/260 |
| 2005/0163244 A1 * | 7/2005 | Seto et al. | 375/267 |
| 2005/0227645 A1 * | 10/2005 | Sudo | 455/127.2 |
| 2005/0249129 A1 * | 11/2005 | Goodall et al. | 370/252 |
| 2005/0276358 A1 * | 12/2005 | Pipilos | 375/345 |
| 2005/0282509 A1 * | 12/2005 | Khayrallah | 455/136 |
| 2005/0286404 A1 * | 12/2005 | Poon | 370/208 |
| 2005/0286663 A1 * | 12/2005 | Poon | 375/347 |
| 2006/0067354 A1 * | 3/2006 | Waltho et al. | 370/433 |
| 2006/0142044 A1 * | 6/2006 | Sung | 455/522 |
| 2006/0187909 A1 * | 8/2006 | Sho et al. | 370/389 |
| 2006/0238257 A1 * | 10/2006 | Han | 330/289 |
| 2007/0129034 A1 * | 6/2007 | Adams et al. | 455/138 |

OTHER PUBLICATIONS

Chapter 1 International Preliminary Report on Patentability from PCT/US2005/042302 mailed Jun. 7, 2007; 7 pages.

Foreign Office Action dated Nov. 14, 2008 for MY Application Serial No. PI 20055149, 3 pgs.

* cited by examiner

SYSTEM AND METHOD CAPABLE OF CLOSED LOOP MIMO CALIBRATION

BACKGROUND

Wireless communications has become prevalent throughout society creating the need for faster and more reliable wireless communication techniques. Although not limited in this respect, one such technique, 802.11n is designed to increase WLAN speeds to at least 100M bps for data and actual throughput rates. Unlike current ratified standards-802.11a, 802.11b and 802.11g-802.11n focuses on throughput at the MAC (media access control) interface, rather than as a signaling bit rate in the physical layer. This means the throughput rates will more likely match the highest-possible data rates. This standard may operate in the 5 GHz range along with 802.11a, although the present invention is not limited to these frequency ranges.

One technique used in 802.11n includes calibration and implicit feedback for closed loop multiple input multiple output (MIMO), which depends on the radio calibration to establish the channel reciprocity. However, this technique may use self calibration which requires transmit and receive chains on different chips, which may increase cost.

Thus, a strong need exists for an apparatus and method capable of improved wireless communication techniques that overcome the aforementioned shortcomings.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
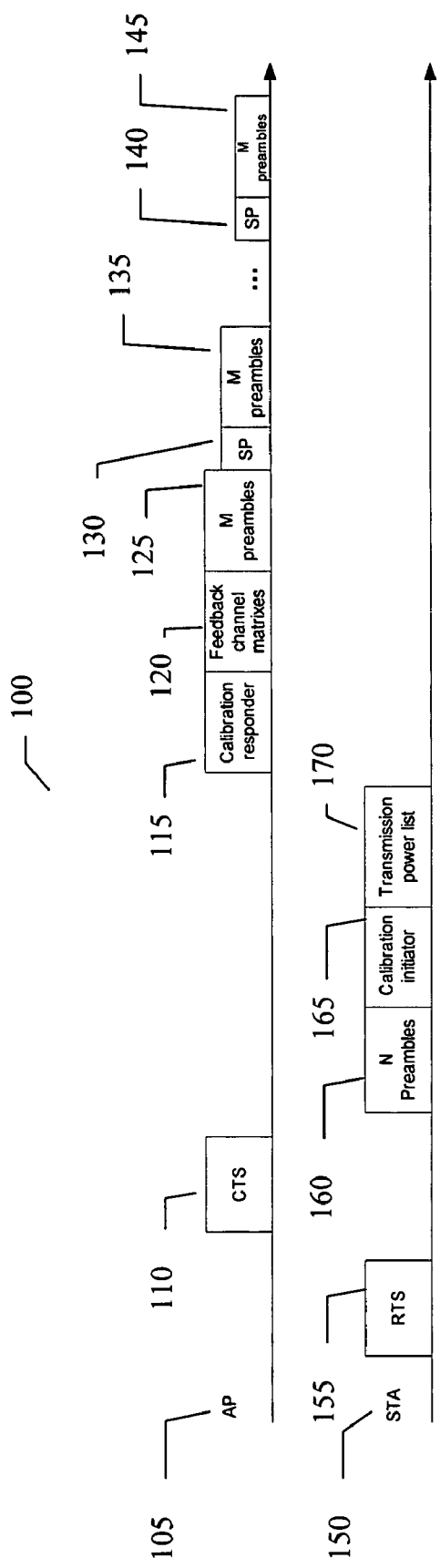
FIG. 1 illustrates a calibration protocol for one device of one embodiment of the present invention with the height of blocks illustrating transmission power level.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like).

Multiple-input multiple-output (MIMO) antenna technology is a promising candidate for IEEE 802.11n high throughput and 802.16d standard. It is understood that these standards are just a couple of many wireless communication techniques that are intended to fall within the scope of the present invention and any standards illustrated herein are intended to merely exemplify techniques which may obtain benefits by utilizing the present invention.

The 802.11n standards group has been working on a closed loop MIMO technique which may have significant advantages over the mandatory open loop MIMO systems. An "implicit" feedback, which depends on radio calibration to establish the channel reciprocity, may be used in the 802.11n wireless communication standard and requires calibration. This method has an advantage of potential lower cost on the wireless station (STA) side. In an embodiment of the present invention is provided medium access control (MAC) procedures for radio calibration, although the present invention is not limited in this respect.

An embodiment of the present invention may provide mutual calibration as opposed to self calibration, since self calibration requires transmit and receive chains on different chips, which may increase cost. The RF amplifiers of a MIMO receiver usually operate in a range of gain due to distance and channel fading. The amplifier response varies with the amplification gain, which is determined by the automatic gain control (AGC) setting. The response of the AGC setting that is used to receive the training symbols may be calibrated in order to use the reciprocity to obtain the reverse channel state information for beamforming transmission. The calibration of the response of an AGC setting may require coordination from a transmitter. The transmitter sends calibration symbols with the proper transmission power level so that the amplified received signal at the designated AGC is not clipped or is not overwhelmed by thermal noise. The calibration range of the AGC settings is usually limited by the transmission power of the calibration partner. On the other hand, the operation range of amplifier gain is usually within 20 dB for a static link between two wireless local area network (WLAN) devices. Therefore, it is not necessary or feasible to calibrate the whole range of the amplifier, which is more than 60 dB.

Turning now to FIG. 1, illustrated generally as 100, is a calibration protocol for one device of one embodiment of the present invention with the height of blocks illustrating transmission power levels. In FIG. 1 the receive chains of the station (STA) 150 are calibrated by the help of the access point (AP) 105. Although not limited in this respect, an embodiment the present invention may provide that the calibration be only between two devices which want to communicate. For example, a station (STA) 150 may only want to calibrate with the AP (105) because the STA 150 may not want a direct link to other stations. Further, the validity of the previous calibration may be checked by looking at the crosstalk between two received, beamformed spatial streams and the desired operating AGC setting of a link may be obtained by requesting a CTS 110 or ACK (not shown) from the other device. Although not limited in this respect, in an embodiment of the present invention, the device may only need to calibrate a range (10-20 dB) of AGC settings around the desired setting.

The AGC range that needs to be calibrated may be different for different devices and the AGC gain resolution used in the calibration may be also different for each device for different devices. In an embodiment of the present invention, when a device sends a list of transmission power to the other device, the other device may vary its transmission power according to the list so that the varying, received signal magnitude fits a sequence of AGC settings under calibration. If a calibrating AGC level corresponds to an amplified gain below the desired gain, the calibration partner may either increase transmission power, which may be out of spec, or send more preambles for that level than those for the desired. Although not limited in this respect, it is assumed in an embodiment of the present invention that transmission characteristics, like output power, do not vary for nominal data exchange by all devices in the cell, which obviates the need to consider calibrating the power amplifier (PA) settings.

Continuing with FIG. 1, the STA 150 detects that its calibration is obsolete and requires a calibration. The STA 150 only calibrates the useful AGC settings, which it employs to communicate with the AP 105. The station sends an RTS packet 155 or a null data packet to the AP 105, and the AP 105 sends back a clear to send (CTS) 110. The short preambles 160 of the CTS 110 help the station to find the desired AGC setting for its link to the AP.

Next, the STA 150 determines a range of AGC, which it wants to calibrate, based on the desired AGC previously obtained and signal variation of the link. The STA 150 also determines a list of transmission power for the AP 105, which facilitates the station to increase (or reduce) amplifier gains.

Next, the station initiates the calibration 165. It sends the power list 170 and N channel sounding preambles 160, where N is the number of transmit antennas at the station. The AP 105 then sends back, via a calibration responder 115, the channel matrix 120 it previously determined. Additionally, it sends L sets of channel sounding preambles 125, 135 and 145 with a different transmission power level for each set, where L is the number of entries in the power list. Each set consists of M preambles; where M is the number of transmit antennas at the AP 105. The STA 150 switches to different AGC levels as AP's transmission power changes. Further, short preambles (SP) 130 and 140 may be inserted between different power levels so that the station can regain synchronization after AGC is switched. After the reception of the L sets of channel soundings, the station may calibrate its chains using the aforementioned.

Figure 2:
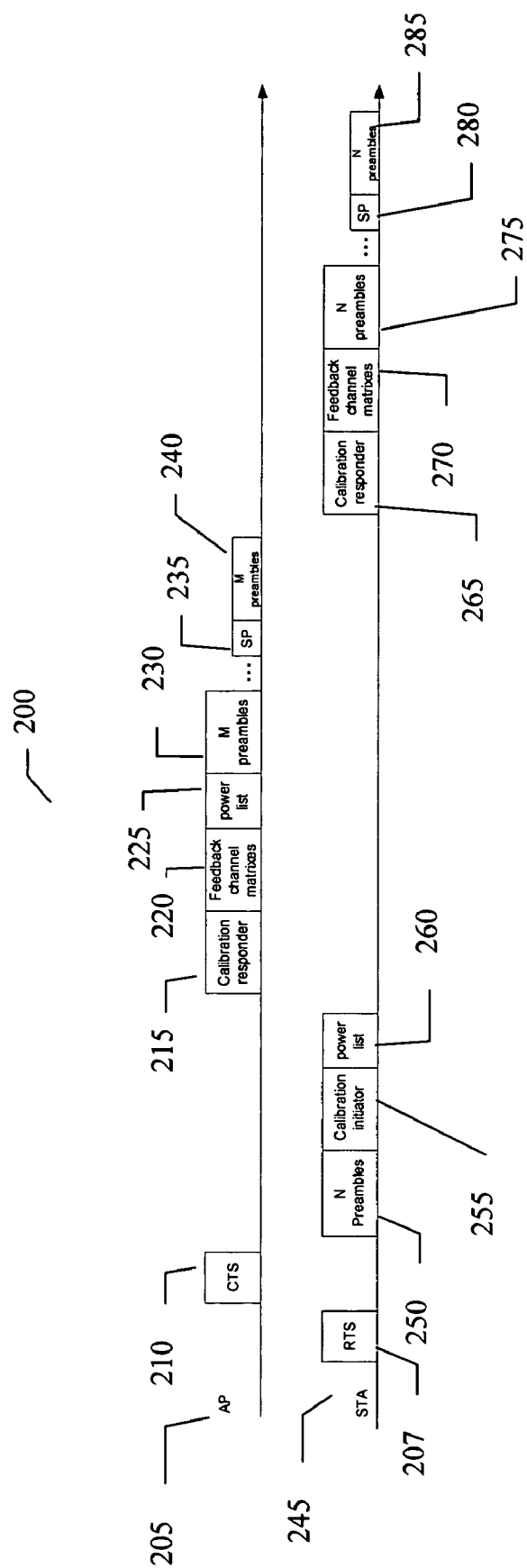
FIG. 2 illustrates a calibration protocol for a pair of devices of one embodiment of the present invention with the height of blocks illustrating transmission power level.

Turning now to FIG. 2, illustrated generally at 200 and not limited to this embodiment, is an example where both the AP 205 and STA 245 want to calibrate their chains. It is similar to the process illustrated above with RTS 207, CTS 210, N preambles 250, calibrator initiator 255, and power list 260; however, in the embodiment of FIG. 2, the AP 205 determines the desired AGC level, the scan AGC range, and scan resolution after the reception of the RTS 250 packet. The AP adds a power list 225 for its calibration with the channel sounding preambles for the station between calibrator responder 215, feedback channel matrixes 220 and N preambles 230.

Finally, the STA sends the channel sounding preambles to the AP 205, which calibrates the AP's different AGC levels. To facilitate both the AP 205 and STA 245 chain calibration, STA calibrator responder 265, feedback channel matrixes 270, short preambles 270, N preambles 275 followed by additional short preambles 280 and N preambles 285 are illustrated in FIG. 2.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of closed loop MIMO calibration in a wireless communication system, comprising:
   using mutual calibration in said wireless communication system by detecting that station calibration is obsolete and requires calibration;
   determining a range of automatic gain control which said station wants to calibrate and determining a list of transmission power for an Access Point (AP) in communication with said station;
   initiating by said station the calibration by sending said power list and N channel sounding preambles, where N is the number of transmit antennas at the station;
   receiving from said AP a channel matrix and L sets of channel sounding preambles with a different transmission power level for each set, where L is the number of entries in the power list;
   switching to an automatic gain control level of the station in response to the transmission power level received from said AP; and
   sending calibration data to said AP to calibrate a range of automatic gain control for the AP to transmit to the station.

2. The method of claim 1, wherein each of said L sets of channel sounding preambles consists of M preambles, where M is the number of transmit antennas at said AP.

3. The method of claim 1, further comprising switching by said station to different AGC levels as said AP's transmission power changes.

4. The method of claim 1, further comprising inserting short preambles between different power levels so that the station can regain synchronization after AGC is switched.

5. The method of claim 1, further comprising calibrating its chains after the reception of said L sets of channel soundings.

6. The method of claim 1, further comprising calibrating by said station only useful AGC settings, which said station employs to communicate with said AP.

7. The method of claim 6, further comprising sending by said station a RTS packet or a null data packet to said AP, and wherein said AP sends back a CTS.

8. The method of claim 7, wherein said short preambles of said CTS help said station find the desired AGC setting for its link to said AP.

9. The method of claim 1, wherein said list facilitates said station to increase or reduce amplifier gains.

10. The method of claim 8, wherein both said AP and said station calibrate their chains by said AP determining the desired AGC level, the scan AGC range, and scan resolution after the reception of said RTS packet and said AP adding a power list for its calibration with the channel sounding preambles for the station and said station sending the channel sounding preambles to said AP, which calibrate said AP's different AGC levels.

11. A wireless communication system capable of closed loop MIMO calibration, comprising:
   a wireless station capable of detecting using mutual calibration that station calibration is obsolete and requires calibration and determining a range of automatic gain control which said station wants to calibrate and determining a list of transmission power for an Access Point (AP) in communication with said station;
   said station to initiate the calibration by sending said power list and N channel sounding preambles, where N is the number of transmit antennas at the station; and
   said station to receive back from the AP a channel matrix and L sets of channel sounding preambles with a different transmission power level for each set, where L is the number of entries in the power list;
   said station to switch to an automatic gain control level of the station in response to the transmission power level received from said AP; and
   said station to send calibration data to said AP to calibrate a range of automatic gain control for the AP to transmit to the station.

12. The system of claim 11, wherein each of said L sets of channel sounding preambles consists of M preambles, where M is the number of transmit antennas at said AP.

13. The system of claim 11, wherein said station is capable of switching to different AGC levels as said AP's transmission power changes.

14. The system of claim 11, wherein said station is capable of inserting short preambles between different power levels so that said station can regain synchronization after AGC is switched.

15. The system of claim 11, wherein said station is capable of calibrating its chains after the reception of said L sets of channel soundings.

16. The system of claim 11, wherein said station calibrates only useful AGC settings, which said station employs to communicate with said AP.

17. The system of claim 16, wherein said station sends an RTS packet or a null data packet to said AP, and wherein said AP sends back a CTS.

18. The system of claim 17, wherein said short preambles of said CTS help said station find the desired AGC setting for its link to said AP.

19. The system of claim 11, wherein said list facilitates said station to increase or reduce amplifier gains.

20. The system of claim 18, wherein both said AP and said station calibrate their chains by said AP determining the desired AGC level, the scan AGC range, and scan resolution after the reception of said RTS packet and said AP adding a power list for its calibration with the channel sounding preambles for the station and said station sending the channel sounding preambles to said AP, which calibrate said AP's different AGC levels.

21. An article comprising a storage computer readable medium having stored thereon instructions, that, when executed by a computing platform, results in:
   using mutual calibration in a closed-loop MIMO system to detect that station calibration is obsolete and requires calibration;
   determining a range of automatic gain control which said station wants to calibrate and determining a list of transmission power for an Access Point (AP) in communication with said station;
   initiating by said station the calibration by sending said power list and N channel sounding preambles, where N is the number of transmit antennas at the station; and
   receiving back from said AP a channel matrix and L sets of channel sounding preambles with a different transmission power level for each set, where L is the number of entries in the power list switching to an automatic gain control level of the station in response to the transmission power level received from said AP; and sending calibration data to said AP to calibrate a range of automatic gain control for the AP to transmit to the station.

22. The article of claim 21, wherein each of said L sets of channel sounding preambles consists of M preambles, where M is the number of transmit antennas at said AP.

23. The article of claim 21, wherein said article further controls the switching by said station to different AGC levels as said AP's transmission power changes.

24. The article of claim 21, wherein said article further controls the inserting of short preambles between different power levels so that the station can regain synchronization after said AGC is switched.

* * * * *

UNITED STATES PATENT AND TRADEMARK OFFICE
CERTIFICATE OF CORRECTION

PATENT NO. : 7,596,355 B2 Page 1 of 1
APPLICATION NO. : 10/999621
DATED : September 29, 2009
INVENTOR(S) : Li et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this

Twenty-eighth Day of September, 2010

David J. Kappos
*Director of the United States Patent and Trademark Office*